US008289985B1

(12) United States Patent
Unice

(10) Patent No.: US 8,289,985 B1
(45) Date of Patent: Oct. 16, 2012

(54) WAVEFORM-INDEPENDENT CONTENTION ACCESS IN A WIRELESS HUB-SPOKE NETWORK USING IP PACKETS

(75) Inventor: W. Kyle Unice, Sandy, UT (US)

(73) Assignee: L-3 Communications, Corp., New York, NY (US)

( * ) Notice: Subject to any disclaimer, the term of this patent is extended or adjusted under 35 U.S.C. 154(b) by 310 days.

(21) Appl. No.: 12/821,900

(22) Filed: Jun. 23, 2010

(51) Int. Cl.
*H04L 12/28* (2006.01)
(52) U.S. Cl. ........................................ 370/414; 370/431
(58) Field of Classification Search ............... 370/310.2, 370/328, 349, 395.41, 414, 431, 445, 447
See application file for complete search history.

(56) References Cited

U.S. PATENT DOCUMENTS

| 6,765,870 | B2 | 7/2004 | Chintada et al. |
| 6,967,936 | B1 | 11/2005 | Laroia et al. |
| 7,454,173 | B2 | 11/2008 | Wiberg et al. |
| 2009/0323611 | A1 * | 12/2009 | Singh et al. ................... 370/329 |

* cited by examiner

*Primary Examiner* — Brenda H Pham
(74) *Attorney, Agent, or Firm* — Kirton McConkie; N. Kenneth Burraston

(57) ABSTRACT

Methods and terminals can use Internet Protocol (IP) packets for waveform independent contention access in a hub-spoke network. In some embodiments, a spoke terminal can transmit a link allocation packet on an uplink when the uplink is available and the spoke terminal has data to transmit. The link allocation packet can be embedded within an IP packet. When the spoke terminal receives the link allocation packet on the downlink, the spoke terminal can transmit one or more IP packets with data, followed by a link release packet. The link release packet can be embedded within an IP packet.

28 Claims, 6 Drawing Sheets

WAVEFORM-INDEPENDENT CONTENTION ACCESS IN A WIRELESS HUB-SPOKE NETWORK USING IP PACKETS

FIELD

The present application relates to wireless communications systems. More particularly, the present application relates to contention access in a wireless hub-spoke network.

BACKGROUND

Wireless communications is becoming increasingly important, with wireless systems finding their way into every growing numbers of applications. Wireless systems are become ubiquitous in the military environment.

Early wireless systems typically operated in a point-to-point arrangement, where a communications link was formed between an individual transmitter and individual receiver. Eventually, networked communications were desired, where communications could occur between several different locations simultaneously using a shared communications channel. Initial networked systems often used manual protocols to ensure that multiple transmitters did not attempt to transmit on the channel simultaneously (and thus interfere with each other). For example, network communications can be directed by a network control operator who periodically polls individual stations to determine if they need to make a transmission.

Many legacy communications systems were initially designed for use in a point-to-point arrangement, and thus are not well suited toward networked communication. This problem can be exacerbated when high speed data communications is desired. In such a system, intervention by a human operator is undesirable due to the resulting inefficiencies and delays that are introduced.

SUMMARY

In some embodiments of the invention, a method for waveform independent contention in a hub-spoke network is provided. The method can be implemented in a hub-spoke network having an uplink from the spoke terminals to the hub terminal and a downlink from the hub terminal to the spoke terminals. The method can include repeatedly transmitting a link allocation packet on the uplink from a first spoke terminal when both (i) the first spoke terminal has data to transmit and (ii) reception of the downlink by the first spoke terminal indicates that the uplink is available. The link allocation packet can be encapsulated in an Internet Protocol (IP) packet and can include a transmit spoke terminal identifier. The method can also include retransmitting on the downlink at least some of the IP packets received on the uplink by the hub terminal. Another operation in the method can include transmitting at least a portion of the data in one or more IP packets from the first spoke terminal. The transmission can occur when the first spoke terminal receives a link allocation packet on the downlink and the transmit spoke terminal identifier of the link allocation packet corresponds to the first spoke terminal. The spoke terminal can transmit a link release packet on the uplink following the transmission of the data. The link release packet can also be encapsulated within an IP packet.

In some embodiments of the invention, a spoke terminal for obtaining waveform independent contention access to a shared wireless communication channel is provided. The spoke terminal can be operated in a hub-spoke network. The spoke terminal can include a wireless transmitter capable of transmitting data embedded within IP packets, and the IP packets can be encoded within a wireless signal on an uplink. The spoke terminal can also include a wireless receiver capable of receiving data which is embedded within IP packets, and the IP packets can be encoded within a wireless signal on a downlink. The spoke terminal can also include a data queue coupled to the wireless transmitter. A data output of the data queue can provide data packets to the wireless transmitter, wherein the data packets can be IP packets. The spoke terminal can also include an access controller coupled to the wireless transmitter and the wireless receiver. A data output of the access controller can provide link allocation packets and link release packets, each embedded within IP packets, to the wireless transmitter. The access controller can enable and disable transmission from the transmitter.

In some embodiments, a spoke terminal for obtaining waveform independent contention access to the shared wireless communication channel of a hub-spoke network is provided. The spoke terminal can include a means for transmitting IP packets on an uplink and a means for receiving IP packets on a downlink. The IP packets can be encoded within a wireless signal on the uplink and downlink. The spoke terminal can also include a means for providing link allocation packets to the means for transmitting. The link allocation packets can be provided when the means for receiving indicates that the uplink is available. The spoke terminal can also include a means for providing at least one data packet to the means for transmitting. The data packet(s) can be provided when the means for receiving has received a link allocation packet on the downlink and the link allocation packet corresponds to the spoke terminal. The spoke terminal can also include a means for providing a link release packet to the means for transmitting. The link release packet can be provided following the at least one data packet. The link allocation packet, the at least one data packet, and the link release packet can each be encapsulated within IP packets.

BRIEF DESCRIPTION OF THE DRAWINGS

Additional features and advantages of the invention will be apparent from the detailed description that follows, taken in conjunction with the accompanying drawings, that together illustrate, by way of example, features of the invention; and, wherein.

DETAILED DESCRIPTION

Figure 1:
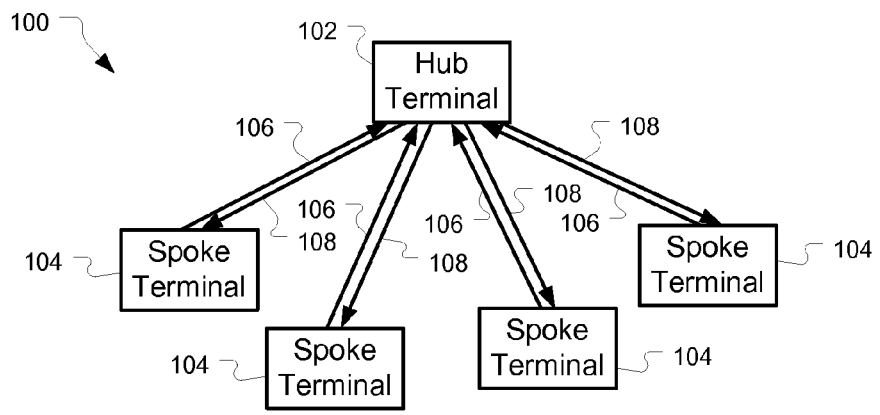
FIG. 1 is a block diagram of a system in accordance with some embodiments of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used:

The singular forms "a," "an," and "the" include plural referents unless the context clearly dictates otherwise. Thus, for example, reference to a terminal includes reference to one or more terminals.

The term "ones" refers to one, two, or more, and generally applies to the selection of some or all of a quantity. The term "plurality" refers to two or more of an item.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

As used herein, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. As a particular example, the time at which two events occur may be substantially the same even though the exact time of the two events differs slightly due to digital clock jitter or noise, differences in propagation delay, or similar factors.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items.

As used herein, the term "alternatively" refers to selection of one of two or more alternatives, and is not intended to limit the selection to only those listed alternatives unless the context clearly indicates otherwise.

Turning to FIG. 1, a system is illustrated in accordance with some embodiments of the present invention. The system, shown generally at 100, can include a plurality of terminals. For example, a hub terminal 102 can be in communication with a plurality of spoke terminals 104. The terminals can include means for establishing wireless communications as illustrated by examples below. For example, spoke terminals can transmit to the hub terminal via one or more uplink channels 106, and the hub terminal can transmit to the spoke terminals via one or more downlink channels 108. While only one hub terminal is shown, the system can include more than one hub terminal, and spoke terminals can be in communication with one or more hub terminals. The uplink and downlink channels can, for example, be on different frequencies (e.g., in a frequency division duplex system).

The hub terminal 102 can, for example, act as a repeater. The hub terminal can receive a message transmitted from one of the spoke terminals 104 on the uplink 106. The hub terminal can retransmit the message on the downlink 108 for reception by one or more of the spoke terminals.

As a particular example, an uplink 106 channel and a downlink 108 channel can be shared by all of the terminals in the system 100. Use (e.g., transmissions) on the downlink can be controlled (e.g., scheduled) by the hub terminal 102. Use of the uplink can be more difficult to control, however, since many different spoke terminals 104 can transmit on the uplink channel. Use of the uplink can also be controlled by the hub terminal, but this can involve the hub terminal knowing which spoke terminals need access to the uplink.

As one example of managing access, the hub terminal can provide fixed time slots which are used by the spoke terminals in a multiplexing approach referred to as time division multiple access (TDMA). TDMA can, however, be inefficient, as time slots allocated to spoke terminals which have nothing to transmit are wasted. Moreover, the number of spoke terminals which can be accommodated in the system is generally limited to the number of time slots.

An alternate approach to sharing access, referred to as ALOHA, is where spoke terminals simply transmit data whenever they have data to transmit. Of course, this approach can also be inefficient, as collisions sometimes occur when two different spoke terminals are transmitting data during an overlapping time interval. This can result in a loss of data.

One disadvantage of many access approaches, such as TDMA and ALOHA, is that control of access typically involves operations which are performed at low layers of the protocol stack. For example, when referring to the seven layer protocol model promulgated by the International Standards Organization (ISO), channel access control is typically managed at the physical or media access control layers. Accordingly, it can be difficult to integrate access control techniques into a communication system which already uses a defined waveform structure.

It has been recognized by the present inventor that it would be advantageous to provide a contention access system which would allow shared access to wireless channels in a hub-spoke network which can operate over differing types of waveforms. In particular, it would be advantageous to provide a contention access system which can be independent of the particular waveform being used by the wireless system. Accordingly, a method for waveform-independent contention access in a hub-spoke network has been developed. The method can include an access control system which is based on the use of internet protocol (IP) packets which can be operated over various differing wireless communications waveforms. In contrast to multiple access techniques which focus on physical layer radio frequency waveforms (e.g.

using special physical layer signaling at layer 1 or layer 2), the method can use upper layer (e.g., network layer signaling at layer 3) packets to control and arbitrate transmissions by different spoke terminals. The method can thus, in some embodiments, be overlaid on an existing communications system.

In some embodiments, transmission on the uplink can be contended for by the spoke terminals 104 based on transmission and reception of a link allocation packet (LAP) and a link release packet (LRP). The LAP and the LRP can each be embedded in corresponding IP packets. A spoke terminal desiring access to the uplink (and downlink) can transmit one or more LAPs (each embedded in an IP packet) until an LAP is received on the downlink. The LAP can include a transmit spoke terminal identifier. For example, the LAP can include data which allows the identity of the transmitting spoke terminal to be identified. The hub terminal 102 can retransmit received LAPs on the downlink. If only a single spoke terminal is requesting access to the channel, its own LAP will most likely be received correctly by the hub terminal on the uplink and retransmitted on the downlink. Thus, when the spoke terminal receives its LAP on the downlink, it knows that it has captured the uplink. Once the spoke terminal has captured the uplink, it can transmit data. Conversely, if multiple spoke terminals transmit LAPs simultaneously, they will likely collide, and thus no LAPs will be received on the downlink. If a first spoke terminal transmits before a second spoke terminal such that its first LAP gets through without collision, the second spoke terminal will see that the first LAP received on the downlink is not its own, and thus will know that it has not captured the channel.

Before transmitting the LAP(s), the spoke terminals can wait until the uplink is available. For example, the status of the uplink can be based on reception on the downlink. For example, reception of an LAP from another terminal indicates that the uplink is unavailable. Reception of a LRP, however, indicates that the uplink is available. If desired, a timeout can also be used, such that lack of reception of any packets on the downlink for a period of time indicates that the uplink is available.

Once a terminal has captured the uplink, it transmits its data in one or more IP packets. Following the data transmission, a LRP is immediately sent. The LRP lets all spoke terminals know that the channel is now again available, and the contention access process can be repeated by any spoke terminals having data they wish to transmit.

Since the LAP and LRP are intended to be received by all of the spoke terminals, they can be transmitted as a broadcast or multicast type IP packet. In particular, the destination address of the IP packet can be set to an address which is reversed for broadcast or multicast usage. In contrast, the data packets can be addressed to a particular spoke terminal, and thus can have a destination address corresponding to the destination spoke terminal (or other destination address). Data packets can also be addressed as broadcast or multicast packets. The source address can be set to that of the spoke terminal, in which case it can also serve as the spoke terminal identifier. Alternatively, the source address can correspond to a source address other than the spoke terminal.

To summarize, the access method can include repeatedly transmitting LAPs on the uplink from spoke terminals having data to transmit. The hub terminal can retransmit LAPs on the downlink that it receives on the uplink. A spoke terminal which receives its own LAP on the downlink can transmit data on the uplink (which can be retransmitted on the downlink by the hub terminal). The spoke terminal can transmit a LRP on the uplink when it is done transmitting data on the uplink (and the hub terminal can retransmit the LRP on the downlink). Data which is transmitted on the uplink by a first spoke terminal can be retransmitted on the downlink by the hub terminal and received on the downlink by a second spoke terminal.

Because the LAP and LRP are embedded within IP packets, no changes or modifications of the waveform and media access control portions of the wireless waveforms need be made. Thus, this approach can be overlaid onto an existing communication system. For example, a system which is designed for operation in a broadcast or ALOHA type of operation mode can use these access contention techniques.

Figure 2:
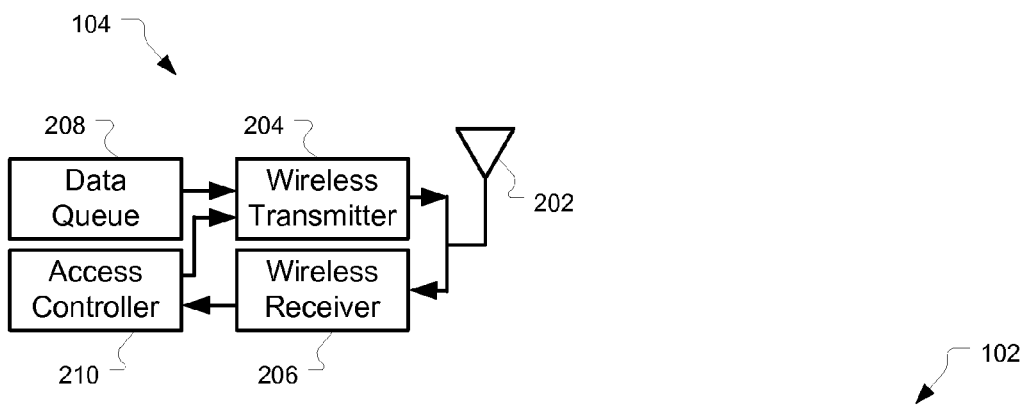
FIG. 2 is a block diagram of a spoke terminal in accordance with some embodiments of the present invention.

Various embodiments of the access control techniques will be described in further detail in conjunction with FIGS. 2-4. FIG. 2 illustrates an example embodiment of a spoke terminal 104, FIG. 3 illustrates an example embodiment of a hub terminal 102, and FIGS. 4A-4D illustrates message flow diagrams for communications between a first spoke terminal, a second spoke terminal, and a hub terminal.

A spoke terminal 104 can include, in some embodiments, an antenna 202, a wireless transmitter 204, and a wireless receiver 206. The wireless transmitter can accept data which is embedded into IP packets and encoded (e.g., modulated) into a wireless signal for transmission. The wireless receiver can accept a wireless signal and extract (e.g., demodulate) IP packets encoded within the wireless signal. The wireless transmitter and wireless receiver can be connected to and can share the antenna (for example, using components such as a diplexer (not shown), duplexer (not shown), antenna switch (not shown), or the like). For example, transmission and reception can use different frequencies (e.g., in a frequency division duplex system). The wireless transmitter and the wireless receiver can be capable of full duplex operation (simultaneously transmission and reception). As another example, transmission and reception can occur at different times (e.g., in a time division duplex system). A data queue 208 can be coupled to the wireless transmitter and can accept data to be transmitted by the wireless transmitter. The data queue can output IP packets for transmission by the wireless transmitter. The data queue can be a priority data queue. Alternatively, more than one antenna can be provided, and the wireless transmitter and wireless receiver can be connected to different antennas. Connection to the antenna need not be direct, as filters, amplifiers, directional couplers, and similar components can be interposed between the wireless transmitter/receiver and the antenna. Portions of the wireless transmitter and wireless receiver can be shared or common (e.g., in a wireless transceiver). The wireless receiver is an example of a means for receiving IP packets on the downlink. The wireless transmitter is an example of a means for transmitting IP packets on the uplink.

An access controller 210 can be coupled to the wireless transmitter 204 and the wireless receiver 206 and can control transmission of data packets and control packets. For example, the access controller can enable transmission of data from the wireless transmitter at certain times based on what has been received by the wireless receiver. The access controller can also provide control packets (e.g., LAP and LRP) to the transmitter for transmission.

Figure 3:
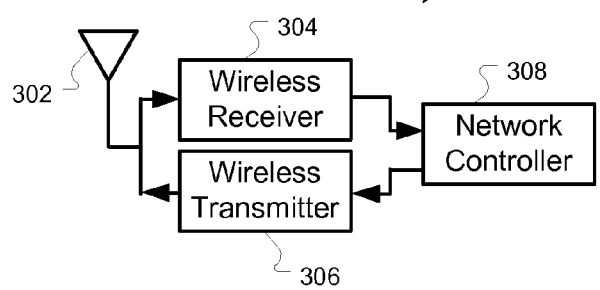
FIG. 3 is a block diagram of a hub terminal in accordance with some embodiments of the present invention.

A hub terminal 102 is illustrated in FIG. 3. The hub terminal can include, in some embodiments, an antenna 302, a wireless receiver 304 coupled to the antenna, and a wireless transmitter 306 coupled to the antenna. The wireless receiver can be coupled to the wireless transmitter to allow for data packets received by the wireless receiver (e.g., on the uplink) to be retransmitted by the wireless transmitter (e.g. on the downlink). The hub terminal can, if desired, include a network controller 308. The net controller can provide for transmission on the downlink of various useful information (e.g., a hub epoch packet, described further below), determine what uplink packets to retransmit on the downlink, and other functions, various example of which are described further below.

Turning to FIGS. 4A-4D, various examples of operation in the network will now be illustrated. In FIGS. 4A-4D, time is illustrated in the vertical direction. Various network terminals (e.g. spoke terminals and hub terminals) are illustrated by vertical lines. Message flow between the network terminals is shown in the horizontal direction. The message flow lines are slightly diagonal, representative of the fact that message transmissions may not be instantaneous, but may require some amount of time due to the finite length of messages and propagation delay. Thus, a message transmission that begins transmission from a first network terminal at time $t=t_1$ may not be received and recognized by a second network terminal until a later time $t=t_2$, $t_2 > t_1$.

Figure 4A:
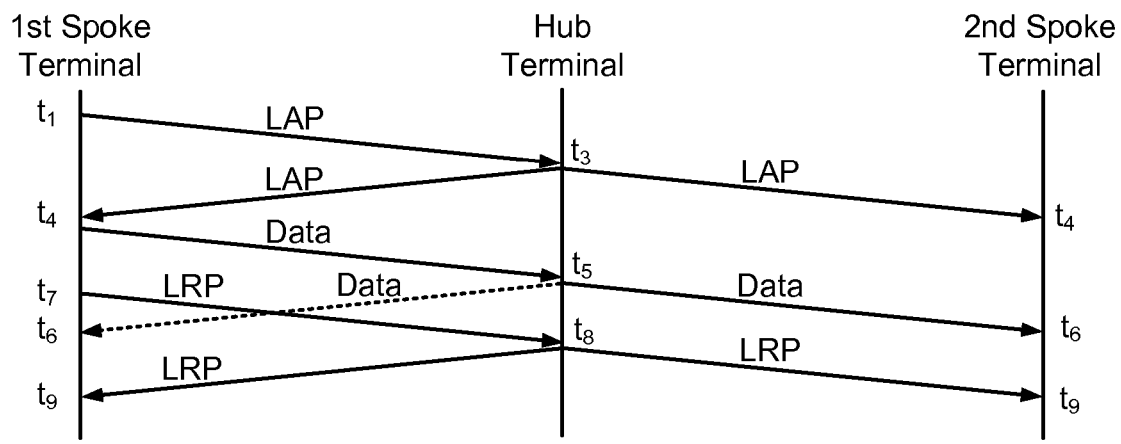
FIGS. 4A-4D show different examples of message flows between spoke terminals and a hub terminal in accordance with some embodiments of the present invention.

In FIG. 4A, an example where a first spoke terminal successfully obtains access to the uplink is illustrated. The first spoke terminal can have determined the uplink is available at time $t_1$. The first spoke terminal can transmit a link allocation packet (LAP) at time $t_1$ to the hub terminal. The LAP can include a spoke terminal identifier which identifies the LAP as having been transmitted by the first spoke terminal. The hub can receive the LAP on the uplink at time $t_3$, and can retransmit the LAP on the downlink. The LAP can be received at $t_4$ by both the first spoke terminal and the second spoke terminal. Reception of the LAP on the downlink tells the first spoke terminal that it has captured the uplink (since the received LAP has the spoke terminal identifier of the first spoke terminal). Reception of the LAP on the downlink also tells the second spoke terminal that the uplink has been captured by a different terminal (since the received LAP has the spoke terminal identifier of a different spoke terminal) and thus the uplink is unavailable. The second spoke terminal thus knows that the uplink is unavailable. Since the first spoke terminal has captured the uplink, it can proceed to transmit its data to the hub starting at time $t_4$. The data can be received by the hub and can be retransmitted at time $t_5$ to the second spoke terminal (and, if the downlink operates in a broadcast mode of operation, the data can also be retransmitted to the first spoke terminal, shown by the dotted line). The data can be received by the second (and first) spoke terminal at time $t_6$. Following transmission of the data, the first spoke terminal can transmit a link release packet (LRP) at time $t_7$, which can be received by the hub and retransmitted on the downlink at time $t_8$. Both spoke terminals can receive the LRP at time $t_9$. Reception of the LRP on the downlink tells the second terminal that the uplink is now available. Although the diagram illustrates the relative times as though $t_5 < t_7$, this is not essential. Depending on the relative length of the data transmission and the propagation and processing delays, it is possible that $t_5 > t_7$.

Figure 4B:
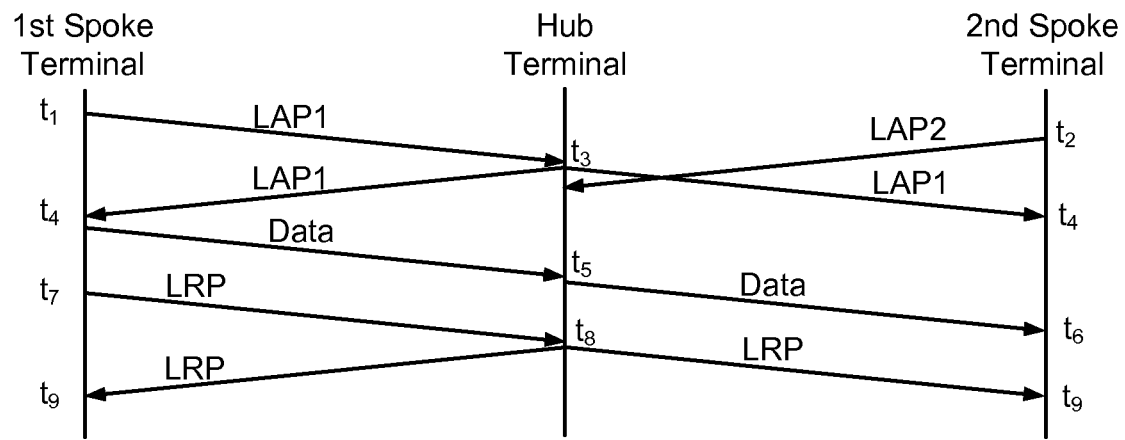

FIG. 4B illustrates an example where both a first spoke terminal and a second terminal attempt to access the uplink, wherein only the first spoke terminal is successful. The first spoke terminal can transmit a LAP ("LAP1") on the uplink at time $t_1$ to the hub terminal, which can be retransmitted by the hub terminal at time $t_3$ on the downlink. Meanwhile, before receiving the LAP from the first spoke terminal on the downlink, the second spoke terminal may also attempt to access the channel can transmit a LAP ("LAP2") at time $t_2$. For this example, $t_2$ is sufficiently after $t_1$ that the LAP from the second spoke terminal does not collide with the LAP from the first spoke terminal. The first spoke terminal and the second spoke terminal can both receive the LAP from the first spoke terminal at time $t_4$, and thus both know that the first spoke terminal has captured the uplink. Thus, the first spoke terminal can transmit the data and LRP as in the previous example.

In the example of FIG. 4B, because the LAPs transmitted from the terminals do not collide with each other, it is possible for the hub to correctly receive the LAP from the second spoke terminal. The hub can either retransmit the second LAP or refrain from retransmitting the second LAP. For example, the hub can include processing capability which recognizes that the LAP from the first spoke terminal was already retransmitted, and thus refrain from retransmitting the LAP from the second spoke terminal. Alternatively, the hub can retransmit all LAPs that are received, and terminals that receive the LAP from the second spoke terminal can ignore it, since they have already received the LAP from the first spoke terminal without an intervening LRP.

Figure 4C:
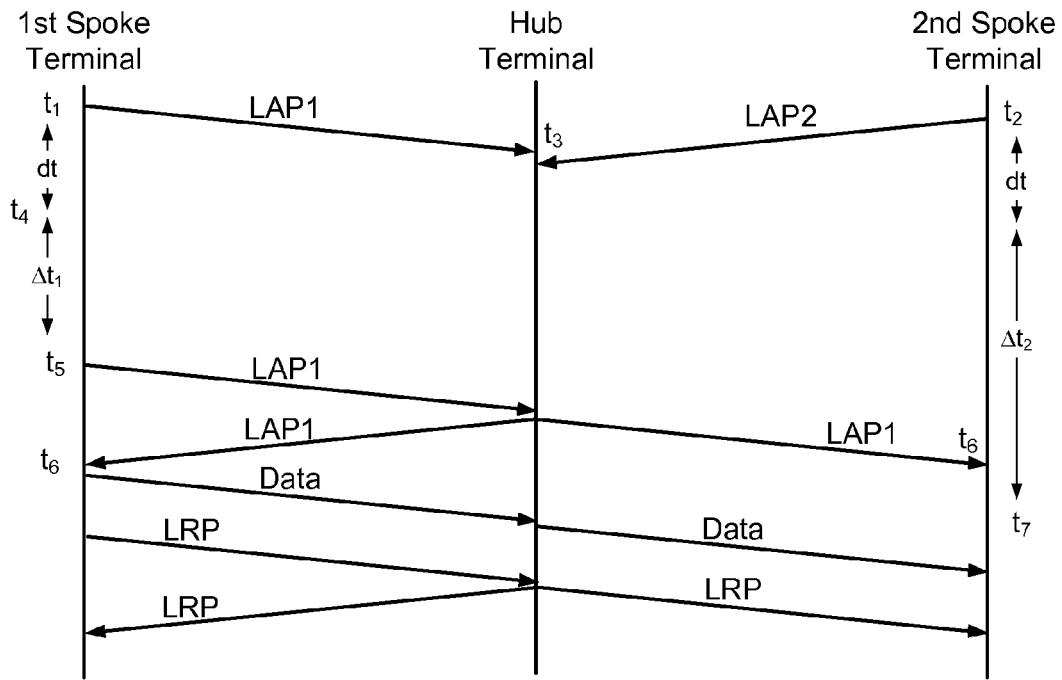

FIG. 4C illustrates an example where both a first spoke terminal and a second terminal attempt to access the uplink which results in a collision. The first spoke terminal can transmit its LAP ("LAP1") at time $t_1$, and the second spoke terminal can transmit its LAP ("LAP2") at time $t_2$ which is sufficiently close to time $t_1$ that the transmissions at least partially overlap at time $t_3$ when arriving at the hub terminal. Thus, the hub terminal may not correctly receive and retransmit either of the LAPs. After a time delay of dt, referred to at the diameter time, both of the spoke terminals can realize that their respective LAP has not been receive on the downlink, and can thus deduce that an uplink collision occurred. For example, at time $t_4$, ($t_4 = t_1 + dt$), had its LAP been received and retransmitted by the hub, the first spoke terminal would have received and processed the LAP.

If each spoke terminal immediately retransmitted a LAP after realizing that a collision had occurred, a second collision would be highly likely. Accordingly, the spoke terminals can implement a random back-off time before again attempting to access the uplink. For example, each time a back-off delay is needed, a random back-off time can be selected from a predefined range of possible back-off delays (e.g., selecting a uniformly distributed random variable between the values of zero and a maximum back-off delay). In this example, the first spoke terminal selects a back-off time delay equal to $\Delta t_1$, while the second spoke terminal selects a back-off time delay equal to $\Delta t_2$, and $\Delta t_2 > \Delta t_1$. The first spoke terminal can wait the time delay of $\Delta t_1$, and then can transmit its LAP at time $t_5$ ($t_5 = t_4 + \Delta t_1$. The LAP can be retransmitted by the hub, and can be received by both spoke terminals at time $t_6$. Because, in this example, the delay $\Delta t_2$ selected by the second spoke terminal results in a scheduled transmission time $t_7$ after it receives the LAP from the first spoke terminal, the second spoke terminal realizes that the channel was captured by the first terminal and so the second terminal doesn't transmit. Transmission of data from the first terminal can proceed as in the previous examples.

Figure 4D:
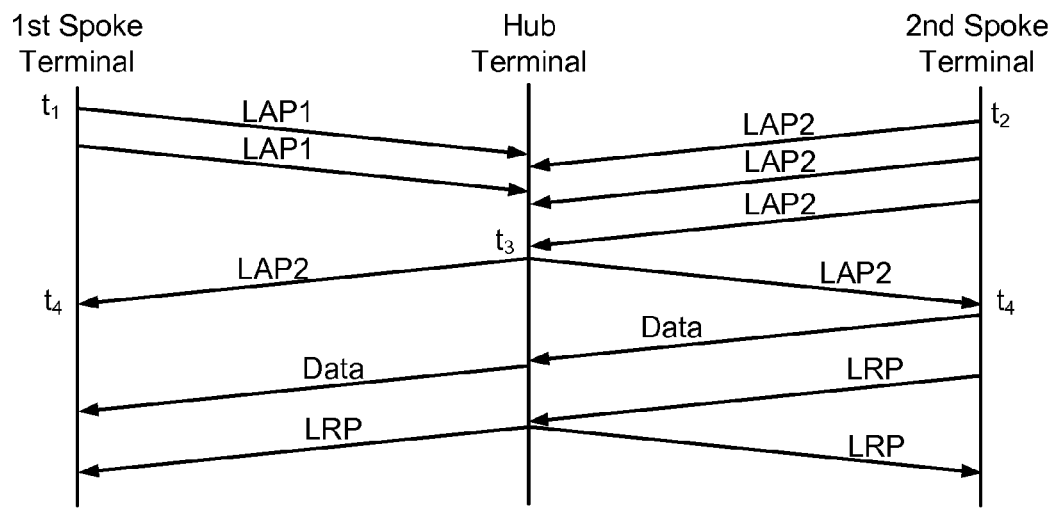

Another aspect of operation is illustrated in FIG. 4D. Here, the spoke terminals each select a random number of LAPs to transmit when they attempt to access the channel. For example, the first spoke terminal can begin transmitting LAPs ("LAP1") at time $t_1$ and the second spoke terminal can begin transmitting LAPs ("LAP2") at time $t_2$. Times $t_1$ and $t_2$ can be sufficiently close that the transmissions collide at the hub. For this example, the first spoke terminal selects two as the random number of LAPs to transmit, while the second spoke terminal selects three at the random number of LAPs to transmit. Thus, all of the LAP transmissions from the first spoke terminal collide with LAP transmissions from the second spoke terminal. The last LAP transmission from the second spoke terminal, however, does not collide and thus can be received by the hub terminal. The hub terminal can receive the LAP from the second spoke terminal at time $t_3$ and can retransmit it on the downlink. At time $t_4$, the spoke terminals can receive the LAP from the second spoke terminal and thus know that the second spoke terminal has captured the uplink. Data transmission from the second spoke terminal can thus proceed as in the previous examples.

Transmitting a randomly selected number of LAP from a spoke terminal when attempting access can provide several benefits. For example, the probability of terminals correctly receiving the LAP can be increased, reducing the risk that a spoke terminal fails to correctly detect the LAP due to errors during transmission. By selecting a random number of LAP for transmission, the possibility of that one of the spoke terminals gets through even when there is a collision is increased. This can help to increase the channel utilization.

The examples of FIGS. 4A-4D are illustrative, and of course variations are possible. For example, the data transmission can use one or more separate packet transmissions. Furthermore, the time delays and processing delays can vary. For example, for high data rate transmissions using a hub terminal disposed on a satellite, the propagation delay can be long relative to the length of an IP packet transmission. Conversely, for low data rate transmissions using a terrestrial hub terminal, the propagation can be short relative to the length of an IP packet transmission. The amount of processing time used by a terminal to recognize a received IP packet can also be long or short relative to the transmission time and propagation delay. For example, software based processing (as described further below) can be relatively slow as compared to hardware based processing (as described further below).

Figure 5:
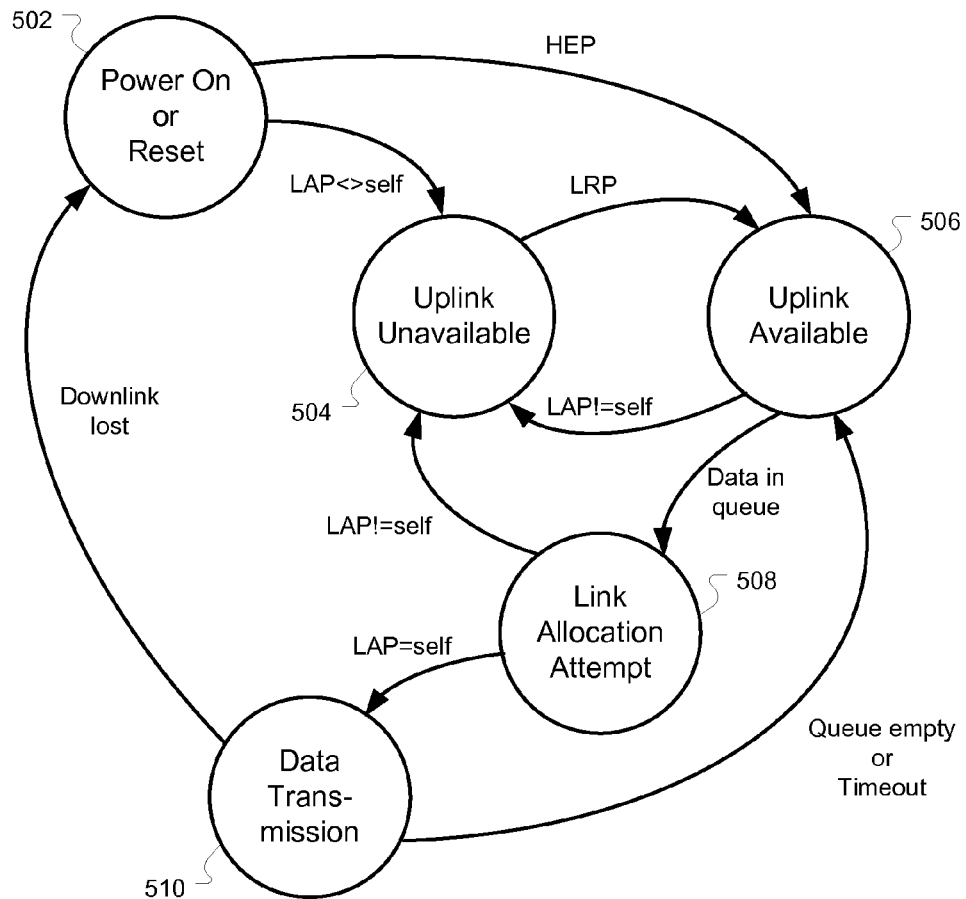
FIG. 5 is a state diagram illustrating operation of a spoke terminal access controller in accordance with some embodiments of the present invention.

Turning to the spoke terminal, one example implementation will now be described in further detail. Returning to FIG. 2, the spoke terminal can include an access controller 210 which controls operation of the spoke terminal. The access controller can determine when transmission of link allocation packets, data packets, and link release packets by the wireless transmitter 204 are allowed to occur. For example, the access controller can be implemented in the form of a state machine using the state diagram illustrated in FIG. 5. The state machine can be implemented using digital hardware (e.g., an application specific integrated circuit, a field programmable gate array, discrete digital hardware, and the like) or in software running on a specialized or general purpose processor. An initial state can be a Power On or Reset state 502. In the Power On or Reset state, the status of the uplink is unknown. Accordingly, transmission from the wireless transmitter can be disabled when in this state. During the Power On or Reset state, the wireless receiver 206 can monitor the downlink. If a LAP is received (which would have been transmitted from a different spoke terminal) the access controller knows that the uplink is unavailable, and thus can transition into the Uplink Unavailable state 504. Conversely, if a LRP is received, the access controller knows the uplink is available, and can thus transition into the Uplink Available state 506. Also, if a Hub Epoch Packet (HEP) (described in further detail below) is received, and the HEP indicates there are no terminals in the network, then the access controller knows the uplink is available, and thus can transition into the Uplink Available state.

When in either the Uplink Unavailable state 504 or the Uplink Available state 506, the access controller 210 can monitor IP packets received on the downlink by the wireless receiver 206. When in the Uplink Unavailable state and an LRP is received, the access controller can transition into the Uplink Available state 506. Conversely, when in the Uplink Available state and an LAP sent from a different spoke terminal (e.g., LAP≠self) is received, the access controller can transition in to the Uplink Unavailable state.

Data transmission can occur after the spoke terminal has captured the uplink, which can occur when the uplink is available. Accordingly, when in the Uplink Available state 506, the access controller 210 can monitor whether there is data to be transmitted in the data queue 208. When data is present in the data queue, the access controller can attempt to capture the uplink, and thus enters the Link Allocation Attempt state 508. In the Link Allocation Attempt state, the access controller can enable the transmitter and provide LAP packets to the wireless transmitter 204 for transmission on the uplink. As discussed above, transmission of the LAP packets can occur in various ways. For example, a single LAP IP packet can be transmitted, multiple LAP IP packets can be transmitted, or a random number of LAP IP packets can be transmitted. While in the Link Allocation Attempt state, the wireless receiver 206 can monitor the downlink. If an LAP sent by the spoke terminal (e.g., LAP=self) is received, the uplink has been captured, and the access controller can transition to the Data Transmission state 510. Conversely if an LAP sent by another terminal is received (e.g., LAP≠self), the uplink has been captured by a different spoke terminal and is now unavailable; the access controller can thus transition to the Uplink Unavailable state 504. Thus, the access controller is an example of a means for providing link allocation packets when the uplink is available.

Once in the Data Transmission state 510, the access controller 210 can provide data packets to the wireless transmitter 204 for transmission on the uplink. The access controller is an example of a means for providing a link release packet. The wireless receiver 206 can continue to monitor the downlink. Exiting the Data Transmission state can occur when all of the data has been transmitted (e.g., no data is waiting in the data queue 208 for transmission), or when a predefine criteria has been reached. For example, data transmission can be ended after a predefined maximum transmission time interval has been reached. Such a maximum transmission time interval can be beneficial to allow the opportunity for other spoke terminals to obtain access to the channel. As another example, data transmission can be ended after a predefined maximum number of data packets have been transmitted. Such a predefined maximum number of data packets can provide similar benefits as a maximum transmission time interval. When transmission of data has ended, an LRP can be transmitted, and the access controller can disable the transmitter and return to the Uplink Available state 506. If not all of the data in the data queue was transmitted, the access controller can transition back into the Link Allocation Attempt state 508 (e.g., after a back-off interval, as discussed above).

If desired, the Data Transmission state 510 can also be exited if the downlink is lost for some reason. For example, the downlink might be loss due to fading, blockage, or other reasons. If the downlink is lost, it is not possible for the spoke terminal to determine the state of the uplink, and thus the access controller 210 can disable the transmitter and return to the Power On or Reset state 502. The access controller 210 is an example of a means for providing at least one data packet for transmission on the uplink.

The previous example is simplified in the interest of brevity, and many variations and enhancements are possible. For example, as discussed above, when the channel is determined to be available, spoke terminals can implement a random back-off before transmitting. This can be implemented in several different ways. For example, exiting the Uplink Unavailable state 504 can be delayed by the back-off interval after a LRP is received. As another example, entering the Link Allocation Attempt State can be delayed by the back-off interval. As yet another example, the Link Allocation Attempt State can include waiting the back-off interval.

Additional state transitions can also be included to deal with collisions and lost packets. For example, when in the Link Allocation Attempt state 508, if an access timeout (a predefined period of time) has elapsed without receiving any LAP on the downlink, the access controller 210 can assume a collision occurred and transition into the Uplink Available state 506. Alternatively, after the timeout the access controller can transition into the Uplink Unavailable state 504. When in the Uplink Unavailable state, if no packets are received on the downlink for a data timeout, the access controller can transition into the Uplink Available state.

The access timeout can be set equal to a diameter time of the network. The diameter time is equal to the maximum end to end packet processing time in the network (e.g., the time between transmitting an IP packet from a first spoke terminal and receiving the IP packet at a second spoke terminal). For example, the diameter time can include two times the propagation delay from the furthest spoke terminal to the hub terminal (i.e. a maximum round trip propagation delay), plus the receive-to-transmit delay within the hub terminal, plus the receive processing delay within a spoke terminal.

Data can be cleared from the data queue 208 based on several different criteria. For example, the data can be cleared after it is successfully transmitted (e.g., defined by reception of the LRP on the downlink). Alternatively, the data can be cleared after it is acknowledged (e.g., reception of a proper response according to a transmission control protocol (e.g., Transmission Control Protocol (TCP) over IP).

Figure 6:
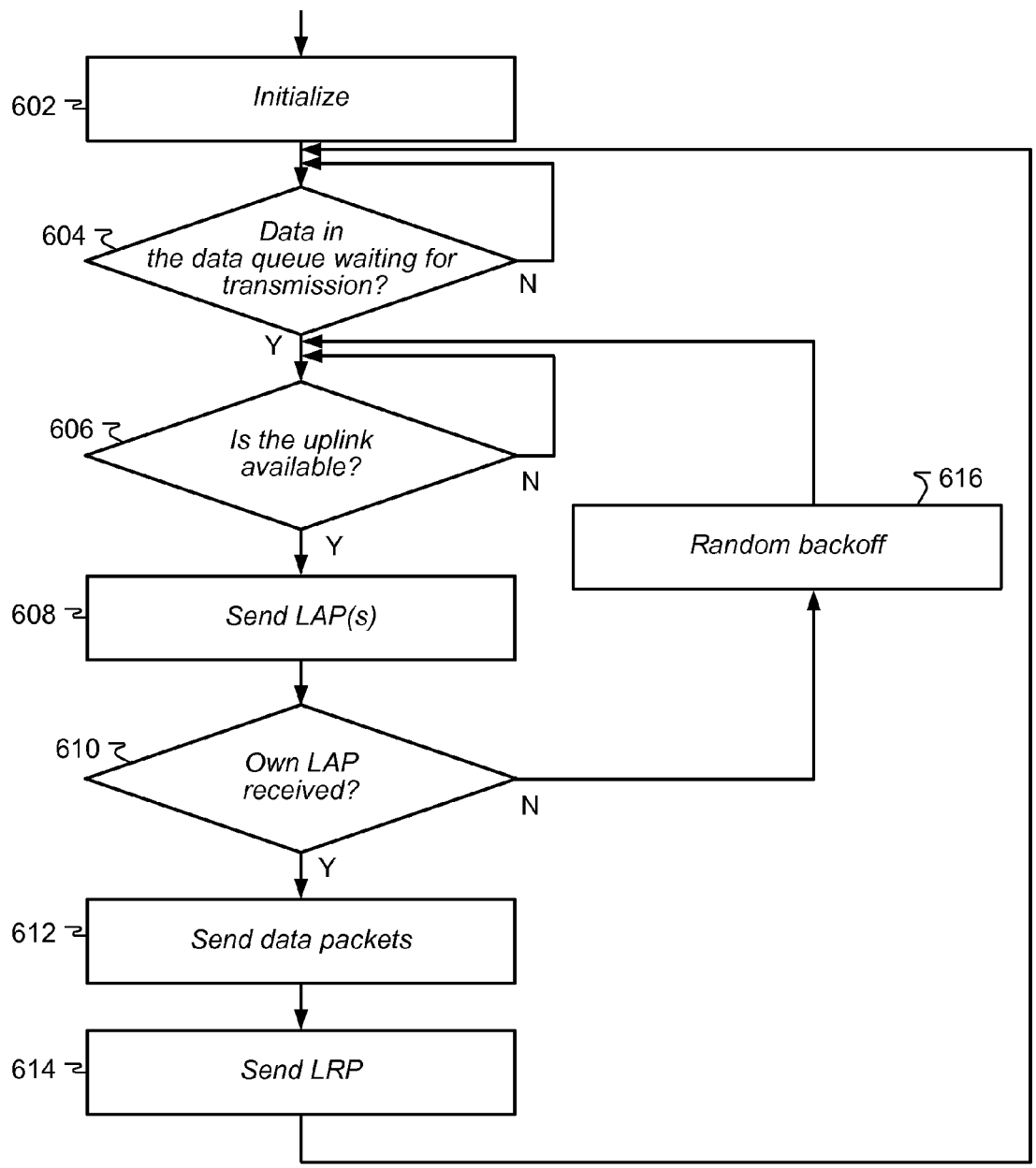
FIG. 6 is a flow chart illustration operation of a spoke terminal access controller in accordance with some embodiments of the present invention.

An example of operation of a spoke terminal 104 is illustrated in a flow chart form in FIG. 6. After initialization in block 602, the spoke terminal can repeatedly check if there is data to send in block 604 (e.g., data is waiting in the data queue 208 for transmission). When there is data to be transmitted, the spoke terminal can wait until the uplink is available in block 606. When the uplink is available, the spoke terminal can begin transmitting LAP IP packets on the uplink in block 608. The spoke terminal can then decide whether its own LAP has been received on the downlink in block 610. If its own LAP is received, the spoke terminal can proceed to transmitting data in block 612 followed by transmitting an LRP IP packet in block 614.

Following completion of the data transmission and LRP, the spoke terminal returns to block 604, where it waits until there is more data to send.

In block 610, if the spoke terminal does not receive its own LAP, it can wait a random back interval in block 616 before returning to block 606 and waiting until the uplink is available.

The discussion of the spoke terminal operation to this point has focused primarily on transmission of data on the uplink by the wireless transmitter 204 under control of the access controller 210. Reception of data on the downlink by the wireless receiver 206 can also occur.

Figure 7:
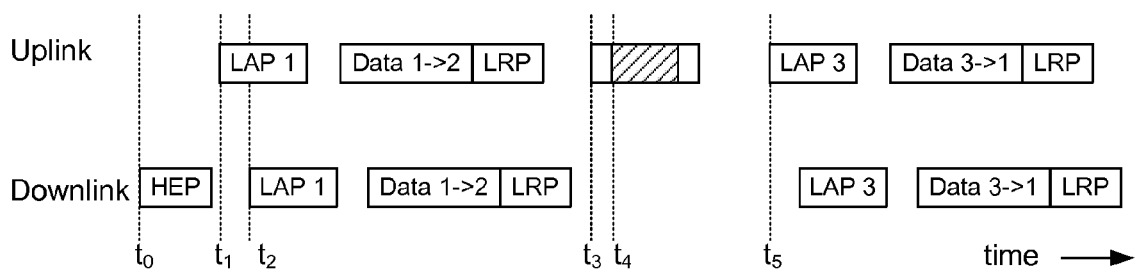
FIG. 7 is an illustration of Internet Protocol packets on an uplink and downlink in accordance with some embodiments of the present invention.

FIG. 7 provides an example of data packets transmitted on the uplink and the downlink showing transmission and reception of data packets by the hub terminal 102 and spoke terminals 104. A time $t_0$, the hub terminal transmits an HEP packet on the downlink. The HEP packet can include information which describes the number of spoke terminals in the network. The HEP can be received by the spoke terminals, and the information about the number of spoke terminals can be used to determine maximum back-off intervals. For example, the maximum back-off interval can be a function of the number of spoke terminals (e.g., increasing with the number of spoke terminals). As another example, the maximum back-off interval can also take into account the diameter time of the network.

A time $t_1$, a first spoke terminal transmits a LAP on the uplink, which can be retransmitted by the hub terminal on the downlink at time $t_2$. The time delay between t1 and t2 can be propagation delay (e.g., on the uplink and downlink) plus delay in the hub terminal (e.g., processing and/or buffering delay). Following reception of the LAP on the downlink, the spoke terminal transmits data packets and a LRP packet on the uplink, which are retransmitted by the hub terminal on the downlink. For example, the data can be directed from the first spoke terminal to the second spoke terminal. The destination of the data can be, for example, specified by the IP addressing information within the IP packet. Data can be transmitted in one or more IP data packets.

At time $t_3$, the second spoke terminal attempts to access the uplink at time $t_4$, however, a third spoke terminal also attempts to access the uplink at a time such that the second spoke terminal and third spoke terminal transmissions overlap. In other words, a collision occurs. No transmission therefore occurs on the downlink at the time.

At time $t_5$ (e.g., after a back-off interval after time $t_4$), a LAP is sent from the third spoke terminal, is retransmitted on the downlink, and then data transmission from the third spoke terminal (to the first spoke terminal) proceeds in a similar manner as the transmission from the first spoke terminal to the second spoke terminal occurred. Thus, transmissions from spoke terminals to each other (through the hub) or from the spoke terminals to the hub can proceed, with terminals contending for access on the uplink.

While the data packet transmissions illustrated in FIG. 7 are shown as a single data IP packet, the data transmission can be broken into multiple IP packets without changing the principles of operation described above.

Returning to the discussion of the hub terminal 102, various options for implementation of the hub terminal are possible. For example, the hub terminal can be disposed on a satellite, a manned aircraft, an unmanned aircraft, a ground vehicle. The hub terminal can be mobile, or alternatively the hub terminal can be in a fixed location.

The network controller 308 of the hub terminal 102 can keep track of the number of spoke terminals in the network. The information can be used, as described above, to adjust back-off intervals. For example, the hub terminal can periodically transmit a HEP which includes information describing the number of spoke terminals. The HEP can also include other information helpful to operation of the network (e.g., settings for the uplink and downlink such as modulation formats, data rates, carrier frequencies, and the like). The HEP can be generated periodically by the network controller and provided to the wireless transmitter 306 for transmission on the downlink.

If desired, the network controller 308 can also manage routing of IP packets. For example, the network controller can accept IP packets received on the uplink by the wireless receiver 304 and determine where to send the IP packets. For example, LAP and LRP packets can be provided to the wireless transmitter 306 for retransmission on the downlink. Data packets can be examined to determine if they are addressed to a spoke terminal within the system (e.g., reachable via the downlink) or a spoke terminal in other system. Data packets addressed to spoke terminals within the system can be provided to the wireless transmitter for transmission on the downlink. Data packets address to other spoke terminals can be passed from the hub terminal to other terminals (not shown) via other communications links (not shown). For example, the hub terminal can include wireless crosslinks (not shown) to other hub terminals (not shown), or the hub terminal can include wired communications links to other terminals. Note that it is not necessary for the hub terminal to retransmit all received IP packets on the downlink, since IP packets may be directed to destinations other than spoke terminals which can be reached on the downlink. Of course, the hub terminal can also refrain from retransmitting received IP packets which are invalid or corrupted (e.g., due to transmission errors or collisions).

Figure 8:
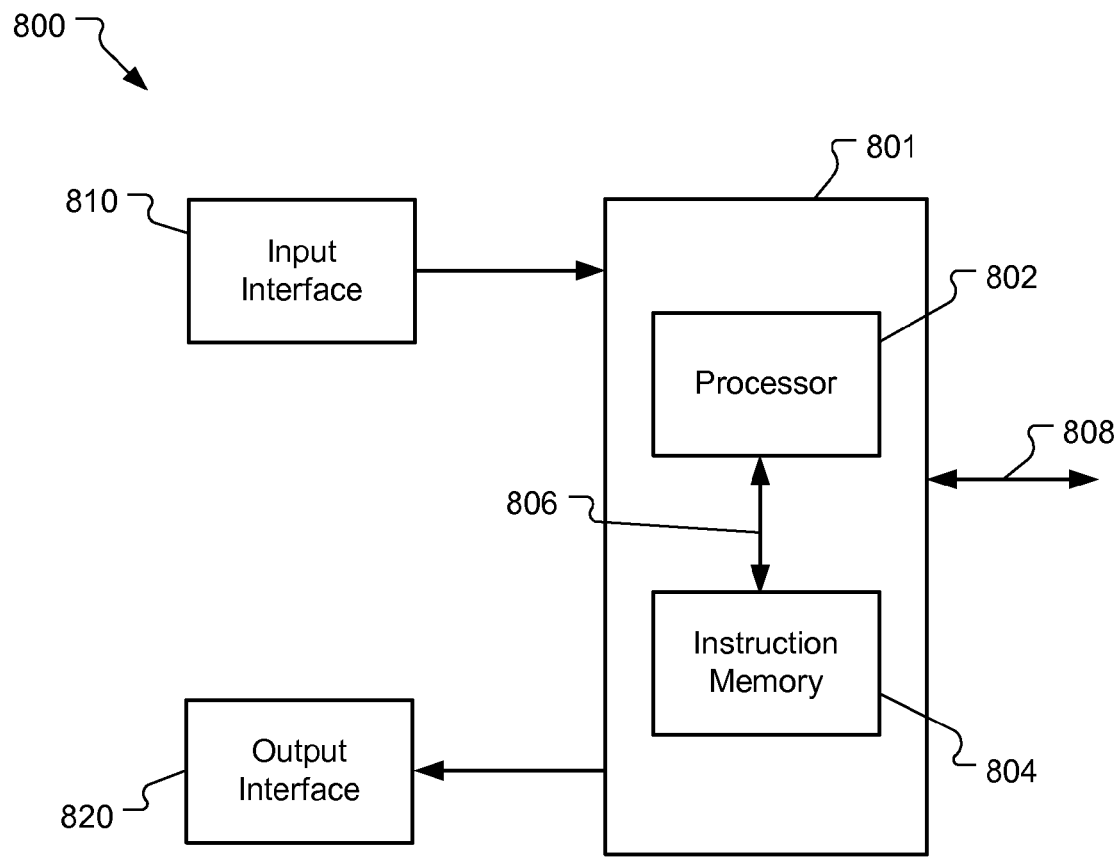
FIG. 8 is a block diagram of a computer system which can be used to implement an access controller in accordance with some embodiments of the present invention.

In some embodiments, all or part of the access controller 210 and/or network controller 308 can be implemented in software for execution on a specialized or general purpose processor. For example, FIG. 8 illustrates a computer system 800 which can be used to implement one or more of the blocks of the access controller. The computer system can include a general-purpose or special-purpose processing subsystem 801. For example, the computer system can be a personal computer, a notebook computer, a personal digital assistant (PDA) or other hand-held device (e.g., a cellular telephone), a workstation, a minicomputer, a mainframe, a supercomputer, a multi-processor system, a network computer, a processor-based electronic device, or the like which is coupled to the other components of the spoke terminal 104. The processing subsystem can include a processor 802 and an instruction memory 804. The processor can be capable of executing computer-executable instructions received from the instruction memory via a bus 806 or similar interface. The processor can be a single processor or multiple processors (e.g., a central processor and one or more other processors designed to perform a particular function or task). The instruction memory can be integrated into the same semiconductor device or package as the processor. The bus can be configured to connect various components of the computer system, and can include any of a variety of bus structures including a memory bus or memory controller, a peripheral bus, or a local bus that uses any of a variety of bus architectures. The bus can be used to interconnect the processor, instruction memory, and other components, such as mass storage devices, input/output interfaces, network interfaces, and the like.

As describer further below, computer-executable instructions can cause the processor 802 to execute functions to implement the blocks as described above. The computer-executable instructions can be permanently stored in the instruction memory 804 or temporarily stored in the instruction memory and loaded into the instruction memory from a computer-readable medium, for example, via an interface 808. The computer-executable instructions can include data structures, objects, programs, routines, or other program modules that can be accessed by the processor. For example, computer executable instructions can include operating system instructions used to establish communication or enable loading of programs, such as during start-up of the computer system. In general, computer-executable instructions cause the processor to perform a particular function or group of functions and are examples of program code means for implementing methods disclosed herein. Furthermore, a particular sequence of the executable instructions provides an example of corresponding acts that can be used to implement the operations of such methods.

Examples of computer-readable media include random-access memory (RAM), read-only memory (ROM), programmable read-only memory (PROM), erasable programmable read-only memory (EPROM), electrically-erasable programmable read-only memory (EEPROM), compact disk read-only memory (CD-ROM), digital video disk (DVD), magnetic medium, or any other device or component that is capable of providing data or executable instructions that can be accessed by a processor. Computer-readable media can be a non-transitory media (e.g., a physical device as described above) which allows for permanent, semi-permanent, or temporary storage of executable instructions.

The computer system 800 can include various input/output interfaces, including for example an input interface 810 which can be used to accept data from the wireless receiver 206. The input interface can use, for example, a serial interface, a parallel interface, a universal serial bus (USB) interface, a firewire interface (IEEE 1394), and the like. The computer system can also include an output interface 820 which can be used to provide data to the wireless transmitter 204. The output interface can be the same or different than the input interface. The computer system can also include other interfaces to components of the spoke terminal, for example, to control other spoke terminal functions.

Accordingly, the computer system 800 can be used to implement the access controller 210 in distinct software modules. The software modules can include instructions to cause the processor 802 to implement the modules. For example, the instructions can correspond to the flow chart of FIG. 7 to provide a computer-implemented method for waveform independent contention access to a shared wireless communications channel in a hub-spoke network. For example, software modules can include a LAP transmission module, an access module, and a data transmission module. Instructions in a LAP transmission module can cause data and control signals to be output to the wireless transmitter 204 to cause the wireless transmitter to send LAP IP packets on the uplink, for example, as described above. The LAP transmission module is an example of a means for providing link allocation packets. Instructions in an access module can accept data input from the wireless receiver 206 and determine whether to reactivate the LAP transmission module or to activate a data transmission module depending on whether the spoke terminal's own LAP has been received on the downlink. Instructions in a data transmission module can output data for transmission to the wireless transmitter to cause the wireless transmitter to send data IP packets and an LRP IP packet, for example, as described above. The data transmission module is an example of a means for providing at least one data packet and a means for providing a link release packet.

If desired, the computer system 800 can also be used to implement the data queue 208. For example, an input interface to the computer system can accept data to be queued for transmission, and the data can be held in a memory (not shown) within the computer system. The processing subsystem 801 can move data from the input interface to the memory for queuing, and move data from the memory to the output interface for transmission. As mentioned above, the data queue can be implemented as a priority queue, where higher priority input data is moved to the output interface for transmission before lower priority input data held within the memory.

The techniques described herein can be implemented in a wireless communications system using any of a variety of different waveforms. For example, the wireless communications can be radio communications, optical communications, acoustic communications, and the like. The system can include the use of spread spectrum (e.g., frequency hopping and/or direct sequence spreading), modulation, forward error correction coding, and other known communications techniques. The wireless transmitter and wireless receiver can include components such as modulators, demodulators, encoders, decoders, interleavers, deinterleavers, upconverters, downconverters, amplifiers, filters, local oscillators, mixers, and other similar components. The waveform on the uplink and the downlink need not be the same. For example, the hub terminal can receive data on the uplink which uses a first waveform (e.g., first modulation format, first data rate, and/or first coding) and retransmit the data on the downlink with a second waveform (e.g., a second modulation format, second data rate, and/or second coding). The data rates on the uplink and downlink can be different.

While the examples illustrated above have used a single uplink and downlink channel, the techniques can be applied when more than one channel are available. For example, transmission of the LAP and LRP can be performed a first uplink channel and second uplink channel, while transmission of data packets is performed on a second uplink channel and a second downlink channel. For example, the first uplink and first downlink channel can be a low bandwidth channel, and the second uplink and second downlink channel can be high bandwidth channel. As another example, multiple uplink and downlink channel pairs can be provided, and contention access for each pair can be provided separately. Alternatively, one uplink and downlink channel pair can be used for contention access to enable data transmission over multiple uplink and downlink channels.

The number of uplink and downlink channels need not be the same. For example, multiple uplink channels operating at a first data rate can be provided, and the hub can retransmit packets received on the multiple uplinks all on a second downlink channel operating at a second data rate which is higher than the first data rate.

The techniques described herein can provide a number of benefits in some embodiments. For example, since the access control techniques described herein can use IP packets, the techniques can be overlaid on an existing wireless communication system without requiring changes to the lower layers (e.g., physical layer, medium access control, and network layers of the ISO seven layer model). As a particular example, in some embodiments, the techniques can be implemented in communications nodes which provide no preexisting capability for multiple access (e.g., a conventional point to point transceiver) to allow for networking capability over a shared uplink and downlink.

Because data is not transmitted until access contention for the uplink is resolved, the risk of data loss is reduced. This can also help to simplify queuing of data. This can be particularly beneficial when operating TCP over IP, since TCP can behave in undesirable manners when data is lost (e.g., reducing the rate at which data transfer is attempted).

While several illustrative applications have been described, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims.

The invention claimed is:

1. A method for waveform independent contention access in a hub-spoke network having a hub terminal and a plurality of spoke terminals, wherein communication from the spoke terminals to the hub terminal is via an uplink and communication from the hub terminal to the spoke terminals is via a downlink, the method comprising:

repeatedly transmitting a link allocation packet on the uplink from a first spoke terminal when the first spoke terminal has data to transmit and reception of the downlink by the first spoke terminal indicates that the uplink is available, wherein the link allocation packet is encapsulated within an internet protocol packet and comprises a transmit spoke terminal identifier;

retransmitting on the downlink at least some of the internet protocol packets received on the uplink by the hub terminal;

transmitting at least a portion of the data in one or more internet protocol data packets on the uplink from the first spoke terminal after a link allocation packet is received on the downlink and the transmit spoke terminal identifier of the link allocation packet corresponds to the first spoke terminal; and transmitting a link release packet on the uplink from the first spoke terminal following the one or more data packets, wherein the link release packet is encapsulated within an internet protocol packet.

2. The method of claim 1, wherein the repeatedly transmitting comprises determining that the uplink is available when any of:

a link release packet is received on the downlink; and a hub epoch packet is received on the downlink, and the hub epoch packet indicates no spoke terminals are present in the network.

3. The method of claim 2, further comprising determining that the uplink is unavailable when any of:

a link allocation packet from a different spoke terminal is received on the downlink; and a transmission from the first spoke terminal on the uplink in not received on the downlink within a diameter time of the hub-spoke network.

4. The method of claim 1, wherein the repeatedly transmitting comprises waiting a random back-off time after the uplink is available to begin transmitting the link allocation packet.

5. The method of claim 4, wherein the random back-off time is a function of the number of spoke terminals in the hub-spoke network.

6. The method of claim 1, wherein the repeatedly transmitting comprises transmitting a random number of link allocation packets.

7. The method of claim 1, further comprising receiving the at least a portion of the data encapsulated in one or more internet protocol packets on the downlink at a second spoke terminal.

8. The method of claim 1, wherein the uplink uses a first frequency and the downlink uses a second frequency, wherein the first frequency is different from the second frequency.

9. The method of claim 1, wherein the uplink uses a first waveform and the downlink uses a second waveform, wherein the first waveform is different from the second waveform.

10. A spoke terminal apparatus for obtaining waveform independent contention access to a shared wireless communications channel in a hub-spoke network, the apparatus comprising:

a wireless transmitter capable of transmitting data embedded within internet protocol packets encoded within a wireless signal on an uplink;

a wireless receiver capable of receiving data embedded within internet protocol packets encoded within a wireless signal on a downlink;

a data queue coupled to the wireless transmitter wherein a data output of the data queue provides data packets embedded within internet protocol packets to the wireless transmitter; and an access controller coupled to the wireless transmitter and the wireless receiver, the access controller having a data output coupled to the wireless transmitter and a data input coupled to the wireless receiver, wherein the access controller:

provides link allocation packets embedded within internet protocol packets to the transmitter when data is waiting in the data queue for transmission, enables transmission of the link allocation packets when a link release packet transmitted by a different spoke terminal is received on the downlink by the wireless receiver, enables transmission of the data packets when a link allocation packet transmitted by the wireless transmitter is received on the downlink by the wireless receiver, disables transmission from the transmitter when a link allocation packet transmitted by a different spoke terminal is received on the downlink by the wireless receiver, disables transmission from the transmitter when any of link allocation packets and data packets transmitted by the wireless transmitter are not received on the downlink within the diameter time of the hub-spoke network, and provides a link release packet embedded within an internet protocol packet to the transmitter when transmission of data is complete.

11. The system of claim 10, wherein transmission of data is complete when transmission of data packets has occurred for a predefined transmission time interval.

12. The system of claim 10, wherein transmission of data is complete when transmission of data packets has occurred for a predefined number of internet protocol packets.

13. The system of claim 10, wherein transmission of data is complete when no data is waiting in the data queue for transmission.

14. The system of claim 10, wherein the access controller implements a random back-off prior to enabling transmission of the link allocation packets.

15. The system of claim 10, wherein the access controller clears transmitted data from the queue when the link release packet is received on the downlink.

16. The system of claim 10, wherein the access controller disables transmission if the downlink is lost.

17. The system of claim 10, wherein the access controller enables transmission of the link allocation packets when reception of a hub epoch packet on the downlink indicates no spoke terminals are present in the network.

18. The system of claim 10, wherein the wireless receiver receives on a first frequency and the wireless transmitter transmits on a second frequency different from the first frequency so that the wireless receiver and wireless transmitter are capable of full duplex operation.

19. A spoke terminal apparatus for obtaining waveform independent contention access to a shared wireless communications channel in a hub-spoke network having a hub terminal and a plurality of spoke terminals, wherein communication to the hub terminal is via an uplink and communication from the hub terminal is via a downlink, and communications uses internet protocols, the apparatus comprising:

means for receiving internet protocol packets on the downlink, wherein the internet protocol packets are encoded within a wireless signal on the downlink;

means for transmitting internet protocol packets on the uplink, wherein the internet protocol packets are encoded within a wireless signal on the uplink;

means for providing link allocation packets to the means for transmitting when the means for receiving indicates that the uplink is available, wherein the link allocation packet is encapsulated within an internet protocol packet;

means for providing at least one data packet to the means for transmitting when the means for receiving has received a link allocation packet on the downlink and the link allocation packet corresponds to the spoke terminal, wherein the at least one data packet is encapsulated within one or more internet protocol packets; and means for providing a link release packet to the means for transmitting following the at least one data packet, wherein the link release packet is encapsulated within an internet protocol packet.

20. The apparatus of claim 19, wherein the means for receiving determines when the uplink is available based on a reception of link release packets on the downlink.

21. The apparatus of claim 19, wherein the means for receiving determines when the uplink is available based on a reception of hub epoch packets on the downlink.

22. The apparatus of claim 19, wherein the means for providing link allocation packets waits a random back-off time after the uplink is available before providing the link allocation packets to the means for transmitting.

23. The apparatus of claim 22, wherein the random back-off time is a function of the number of spoke terminals in the hub-spoke network.

24. The apparatus of claim 22, wherein the random back-off time is a function of the diameter time of the hub-spoke network.

25. The apparatus of claim 19, wherein the means for providing link allocation packets provides a random number of link allocation packets.

26. The apparatus of claim 19, wherein the means for providing a link release packet provides the link release packet to the means for transmitting when all of the data waiting for transmission has been transmitted.

27. The apparatus of claim 19, wherein the means for providing a link release packet provides the link release packet when any of:

a predefined time interval following the first of the at least one data packets has elapsed, and a predefined number of data packets have been transmitted.

28. The apparatus of claim 19, wherein the means for receiving and the means for transmitting each operate on a different wireless frequency to enable full duplex operation.

* * * * *